United States Patent
Kimura et al.

(10) Patent No.: US 12,068,776 B2
(45) Date of Patent: Aug. 20, 2024

(54) DIAGNOSTIC DEVICE AND DIAGNOSTIC METHOD

(71) Applicant: NIPPON TELEGRAPH AND TELEPHONE CORPORATION, Tokyo (JP)

(72) Inventors: Yasutaka Kimura, Musashino (JP); Kazutaka Hara, Musashino (JP); Atsuko Kawakita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 39 days.

(21) Appl. No.: 17/910,557

(22) PCT Filed: Mar. 12, 2020

(86) PCT No.: PCT/JP2020/010680
§ 371 (c)(1),
(2) Date: Sep. 9, 2022

(87) PCT Pub. No.: WO2021/181588
PCT Pub. Date: Sep. 16, 2021

(65) Prior Publication Data
US 2023/0147193 A1  May 11, 2023

(51) Int. Cl.
*H04B 10/073* (2013.01)
(52) U.S. Cl.
CPC .................. *H04B 10/073* (2013.01)
(58) Field of Classification Search
None
See application file for complete search history.

(56) References Cited

U.S. PATENT DOCUMENTS 9,853,764 B2 * 12/2017 Khotimsky ......... H04J 14/0232
11,088,774 B2 * 8/2021 Lee .................... H04J 14/0227
(Continued)

FOREIGN PATENT DOCUMENTS

JP   3819264 B2   9/2006
JP   4810083 B2   11/2011
(Continued)

OTHER PUBLICATIONS

G. E. R. de Paiva et al., 80km Extended Gigabit Passive Optical Network, Microwave & Optoelectronics Conference (IMOC), Oct. 29, 2011, pp. 35-39.
(Continued)

*Primary Examiner* — Pranesh K Barua
(74) *Attorney, Agent, or Firm* — Harness, Dickey & Pierce, P.L.C.

(57) ABSTRACT

In response to the above issue, an object of the present invention is to provide a diagnostic apparatus and a diagnostic method capable of accurately recognizing whether to use a long extension function at the time of relocation of an accommodation station of an OLT. The diagnostic apparatus according to an aspect of the present invention has an allowable line length list that is a relationship between a center wavelength and an allowable line distance that satisfies a selected spectrum width in an optical fiber used in an optical communication system, measures a center wavelength and a spectrum width of a spectrum for each ONU, matches the allowable line length list, and obtains an allowable line distance of each ONU.

8 Claims, 8 Drawing Sheets

(56) References Cited

U.S. PATENT DOCUMENTS

| | | | |
|---|---|---|---|
| 2002/0097969 A1 | 7/2002 | Aikawa et al. | |
| 2006/0098988 A1 | 5/2006 | Sekiya et al. | |
| 2017/0005724 A1* | 1/2017 | Nose | H04B 10/272 |
| 2018/0213307 A1* | 7/2018 | Lin | H04J 14/0236 |
| 2020/0366399 A1* | 11/2020 | Lee | H04J 14/0227 |

FOREIGN PATENT DOCUMENTS

| | | | |
|---|---|---|---|
| JP | 5359412 B2 | 12/2013 | |
| JP | 6586840 B2 | 10/2019 | |

OTHER PUBLICATIONS

Takurou Matsumoto et al., Optical power budget expansion technology for GE-PON system that enables long-distance transmission, NTT Technical Journal, vol. 23, No. 7, 2011, pp. 52-55.

* cited by examiner

| CENTER WAVELENGTH \ WAVELENGTH WIDTH | 1[nm] | 2[nm] | ... |
|---|---|---|---|
| 1260[nm] | L01[m] | L02[m] | L0j[m] |
| 1270[nm] | L11[m] | L12[m] | L1j[m] |
| ⋮ | Li1[m] | Li2[m] | Lij[m] |

DIAGNOSTIC DEVICE AND DIAGNOSTIC METHOD

CROSS-REFERENCE TO RELATED APPLICATIONS

This application is a 371 U.S. National Phase of International Application No. PCT/JP2020/010680, filed on Mar. 12, 2020. The entire disclosure of the above application is incorporated herein by reference.

TECHNICAL FIELD

The present disclosure relates to a diagnostic apparatus and a diagnostic method for diagnosing an optical communication system, particularly a passive optical network (PON).

BACKGROUND ART

A PON is typically used in a fiber to the home (FTTH) service in an optical access network in a point-to-multipoint form in which a single optical line terminal (OLT) that is a station-side transmission apparatus and one or more optical network units (ONUs) that are user-side transmission apparatuses are connected via an optical fiber and a splitter. Also, it is desired to address relocation of accommodation stations in the context of facility and running cost reduction in access networks in recent years.

As one measure for a case in which the distance of an optical fiber between an OLT and an ONU extends with relocation of an accommodation station and users cannot be accommodated in a PON system configuration before the relocation, an application of a long extension technique to the PON system is conceivable.

As factors that inhibit the increase in distance in the PON system, the following two factors can be listed: factor 1) attenuation of optical intensity; and factor 2) waveform distortion due to wavelength dispersion.

The easiest approach to the factor 1) attenuation of optical intensity is a method of recovering attenuated light using a semiconductor optical amplifier (SOA) or a rare earth additive optical fiber amplifier. For example, NPL 1 discloses a PON system with 80 km reach and 128 branches using an SOA and describes an increase in distance and an increase in the number of branches.

Also, in response to the factor 2) the waveform distortion due to wavelength dispersion, a dispersion compensation technique can be used. Dispersion compensation techniques can be roughly categorized into two types: optical region dispersion compensation of compensating for a transmitted signal in an optical region; and electrical region dispersion compensation of receiving a transmitted signal with a photodiode (PD) and compensating for a baseband signal through electrical signal processing.

Major optical region dispersion compensation techniques include a method of using a dispersion compensation fiber (DCF), a method of using a fiber Braff grating (FBG), and a method of using a virtually imaged phased array (VIPA) (see PTL 1 to 3, for example).

In the electrical region dispersion compensation technique, a finite impulse response (FIR) filter is used so that a current obtained by photoelectric conversion using a PD is converted into a voltage signal via a trans-impedance amplifier (TIA), a delay is added every time the signal is tapped, weighting processing of a tap coefficient thereon is performed, and a sum is output. For example, PTL 4 discloses a dispersion compensation circuit configured with a feed forward equalizer using an FIR filter and a determination feedback equalizer that filters a signal after threshold value determination using a determination circuit and feeding back the result.

Also, a transmitter and a receiver that are different from those of the OLT are typically used for the ONU in terms of price reduction. For example, a Fabry-Perot (FP)-laser-diode (LD) is used, which oscillates with a plurality of wavelengths as an LD of a transmitter and has significant waveform distortion due to wavelength dispersion at the time of long-distance transmission. A PIN-photodiode (PD) that does not require a special power source circuit is used as a PD of a receiver.

If the FP-LD is used in the transmitter of the ONU, waveform distortion may be a factor limiting an allowable line length of the PON system. Thus, the long-distance ONU capable of performing long-distance transmission serves uses, as an LD of the transmitter similarly to the OLT, a distributed feedback (DFB)-LD with a transmission output thereof enhanced, because the DFB-LD oscillates in a single mode using diffraction gratings and is unlikely to be affected by dispersion. Also, the long-distance ONU uses an avalanche photo diode (APD) with high reception sensitivity as the PD of the receiver similarly to the OTL (see NPL 2, for example). The DFB-LD used in the long-distance ONU is more expensive than FP-LD, and APD also requires an expensive power source circuit to generate a higher voltage as compared with the PIN-PD.

CITATION LIST

Patent Literature

PTL 1: JP 3819264 B
PTL 2: JP 5359412 B
PTL 3: JP 4810083 B
PTL 4: JP 6586840 B

Non Patent Literature

NPL 1: G. E. R. De Paiva, M. M. Freire, U. R. Duarte, A. B. Sassi, A. C. Bizetti, J. F. Pozzuto, J. B. Rosolem. "80 km Extended Gigabit Passive Optical Network," Microwave & Optoelectronics Conference (IMOC) on Publication Year: 2011, Page(s): 35 to 39

NPL 2: Takuro Matsumoto, Satoshi Shimazu, Hiroshi Kimura, Shoichiro Yamashita, Jin Yamasaki, "Optical Power Budget Enhancement Technologies for Long-reach GE-PON," NTT Technical Review, 52 to 55, 2011. 7

SUMMARY OF THE INVENTION

Technical Problem

As described above, the FP-LD is widely used as a transmitter of ONU in a PON system in terms of cost reduction. But in the FP-LD, wavelength distortion significantly appears due to wavelength dispersion at the time of long-distance transmission. This waveform distortion of the ONU is one factor limiting the allowable line length of the PON system.

Figure 1:
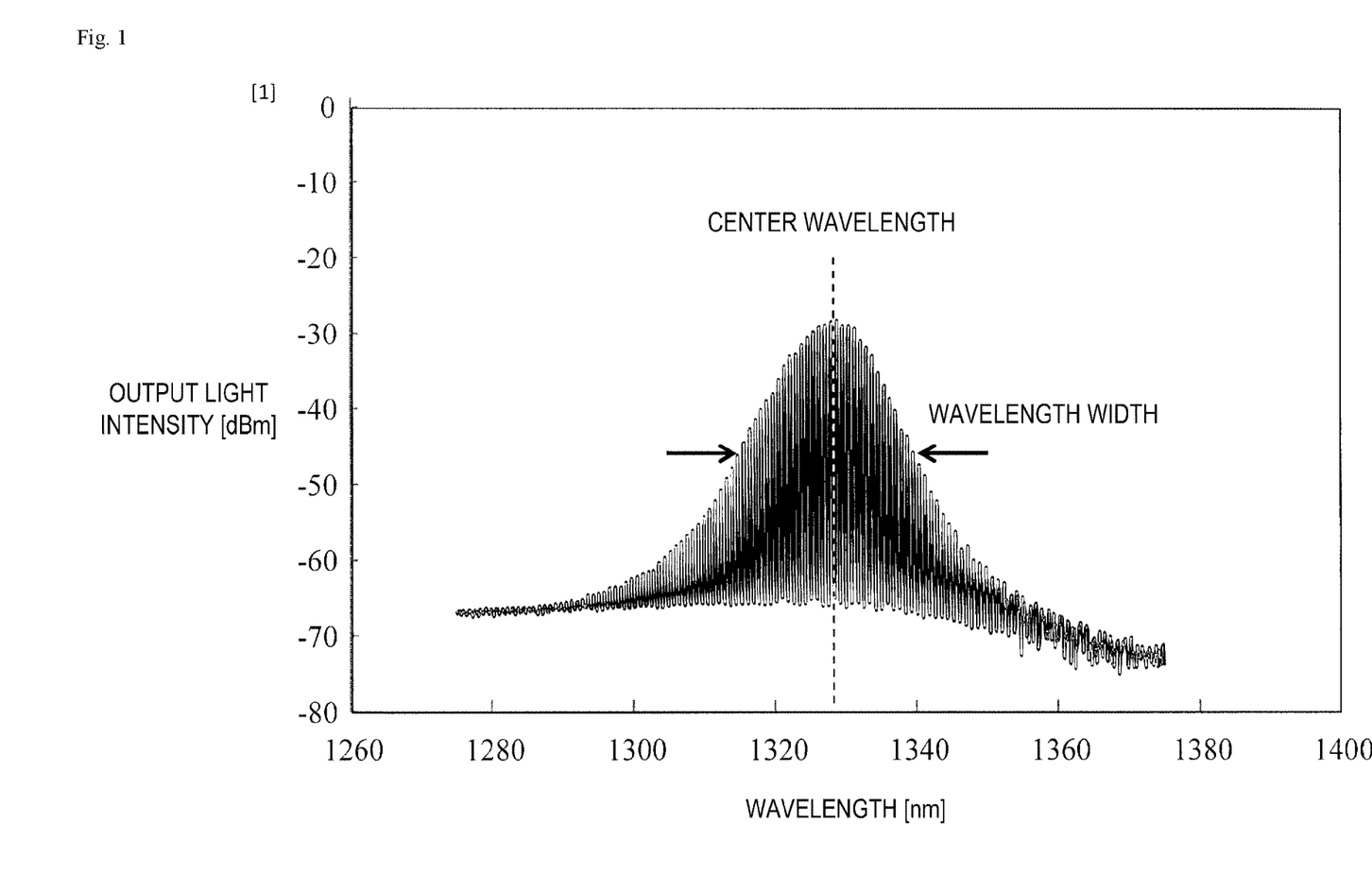
FIG. 1 is a diagram for explaining an oscillation spectrum of an ONU.

FIG. 1 is a diagram for explaining an oscillation spectrum of the FP-LD that is typically used as an LD of the ONU. The ONU oscillates with a plurality of wavelengths over several tens of nm inside a defined wavelength range (1260 nm to 1360 nm for IEEE 802.3 std that is a standard of a GE-PON system, for example). Moreover, the spectrum varies for each ONU. Note that, in the specification, the peak wavelength of an oscillation spectrum will be referred to as a "center wavelength" and a spectrum half width will be referred to as a "wavelength width" or a "spectrum width".

Figure 2:
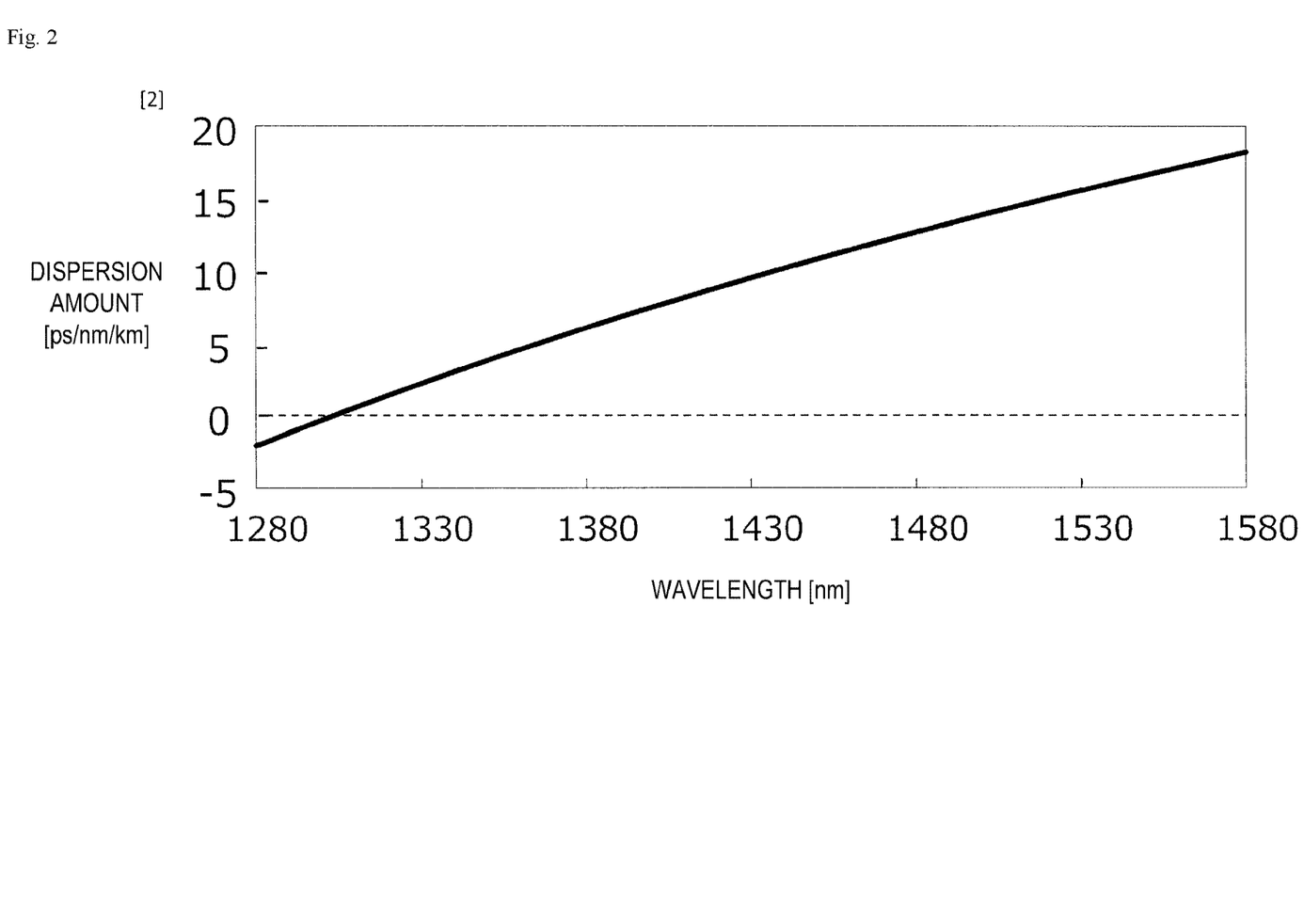
FIG. 2 is a diagram for explaining the amount of dispersion for a wavelength in an optical fiber.

Also, FIG. 2 is a diagram for explaining a relationship between a wavelength and a dispersion amount of a signal mode fiber (SMF) that is typically used as an access-system optical fiber. It is possible to ascertain from FIG. 2 that the dispersion amount differs for each wavelength.

As illustrated in FIGS. 1 and 2, because an oscillation spectrum differs (a wavelength differs) for each ONU, and the dispersion amount of the optical fiber differs for each wavelength, waveform distortion differs for each ONU even if a plurality of ONUs use the same FP-LD and causes light to be propagated the same distance. As a result, propagation distances of optical signals (the distances at which the OLT can accurately receive the uplink optical signals from the ONU) may differ for each ONU.

On the other hand, the accommodation station of OLT may be relocated in the PON system. In this case, a specification value of an allowable line distance with waveform distortion caused by wavelength dispersion of the ONT is compared with the OLT-ONU distance after the relocation, and if the OLT-ONU distance is longer, the situation is addressed with a long extension function (replacement with a long-distance ONU using a DFB-LD with small waveform distortion due to wavelength dispersion or installation of a dispersion compensation instrument), similarly to a case in which a PON system is newly placed. Here, because a spectrum differs for each ONU, and waveform distortion varies as described above, a worst value of the apparatus is employed as the specification value of the allowable line distance. Thus, at the time of relocation of the accommodation station of the OLT, a long extension function that is actually unnecessary is used, that is, replacement with a long-distance ONU and installation of a dispersion compensation instrument, which are actually unnecessary, are performed, and excessive quality or an increase in system cost may occur. In other words, the PON system in the related art has a difficulty in accurately recognizing whether to use a long extension function at the time of relocation of an accommodation station of the OLT.

Thus, in response to the above issue, an object of the present invention is to provide a diagnostic apparatus and a diagnostic method capable of accurately recognizing whether to use a long extension function at the time of relocation of an accommodation station of an OLT.

Means for Solving the Problem

In order to achieve the above object, a diagnostic apparatus according to an aspect of the present invention has an allowable line length list that is a relationship between a center wavelength and an allowable line distance that satisfies a selected spectrum width in an optical fiber used in an optical communication system, measures a center wavelength and a spectrum width of a spectrum of each ONU, matches the allowable line length list, and obtains an allowable line distance of each ONU.

Specifically, a diagnostic apparatus according to an aspect of the present invention is a diagnostic apparatus for an optical communication system including: a signal measurement instrument that is connected to a side end of a first accommodation station in a communication system, measures measurement light transmitted by a terminal connected to an end of the communication system, and measures a center wavelength and a spectrum width of a spectrum of the measurement light; an extraction unit acquires an allowable line distance corresponding to the center wavelength and the spectrum width measured by the signal measurement instrument from an allowable line length list that is a relationship between the center wavelength and the allowable line distance that satisfies a selected spectrum width;

a comparison unit that compares a transmission distance between a second accommodation station newly connected to the communication system and the terminal with the allowable line distance acquired by the extraction unit; and a determination unit that determines that it is not necessary to update the communication system in a case in which the transmission distance is shorter than the allowable line distance and determines that it is necessary to update the communication system in a case in which the transmission distance is longer than the allowable line distance.

Also, a diagnostic method according to an aspect of the present invention is a diagnostic method for an optical communication system including: transmitting measurement light from a terminal connected to an end of a communication system; measuring a center wavelength and a spectrum width of a spectrum of the measurement light measured by a measurement instrument connected to a side end of a first accommodation station in the communication system; acquiring an allowable line distance corresponding to the measured center wavelength and the spectrum width from an allowable line length list that is a relationship between the center wavelength and the allowable line distance that satisfies a selected spectrum width; acquiring a transmission distance between a second accommodation station newly connected to the communication system and the terminal; comparing the allowable line distance acquired from the allowable line length list with the transmission distance; and determining that it is not necessary to update the communication system in a case in which the transmission distance is shorter than the allowable line distance and determining that it is necessary to update the communication system in a case in which the transmission distance is longer than the allowable line distance.

According to the diagnostic apparatus and the diagnostic method of the present invention, it is possible to obtain the allowable line distance of each terminal and thereby to determine whether it is necessary to provide a long extension function for each terminal. In other words, it is possible to reduce utilization of the long extension function that is actually unnecessary at the time of relocation of the accommodation station of the OLT. According to an aspect of the present invention, it is possible to provide a diagnostic apparatus and a diagnostic method capable of accurately recognizing whether to use the long extension function at the time of the relocation of the accommodation station of the OLT.

Here, in a case in which the communication system is a passive optical network (PON), the terminal is an optical network unit (ONU), and the accommodation station is an optical line terminal (OLT), the signal measurement instrument of the diagnostic apparatus according to an aspect of the present invention may perform the measuring of the center wavelength and the spectrum width of the spectrum of the measurement light for each terminal, and the determination unit may perform the determining of whether to update the communication system for each terminal.

Also, the signal measurement instrument of the diagnostic apparatus according to an aspect of the present invention performs the measuring of the center wavelength and the spectrum width of the spectrum of the measurement light by collectively performing the measurement with the measurement light from a plurality of terminals, performing peak analysis on a measurement result for separation into each spectrum of the corresponding measurement light, and measuring the center wavelength and the spectrum width from each separated spectrum, and when the determination unit determines whether to update the communication system, the determination unit determines whether to update the communication system after the center wavelength and the spectrum width of the spectrum of the measurement light are measured again for each terminal if there is at least one spectrum having a transmission distance longer than the allowable line distance.

Note that the diagnostic apparatus according to an aspect of the present invention may further include: a list generation unit, for the allowable line length list, test light may be caused to be propagated in an experiment system using the same optical fiber as an optical fiber in the communication system and a spectrum of the test light in the experiment system may be measured, and a relationship between the center wavelength and an allowable line distance that satisfies a selected spectrum width may be acquired from the spectrum of the test light.

Note that aspects of the inventions described above can be combined with each other to the extent possible.

Effects of the Invention

The present invention can provide a diagnostic apparatus and a diagnostic method capable of accurately recognizing whether to use a long extension function at the time of relocation of an accommodation station of an OLT.

DESCRIPTION OF EMBODIMENTS

Embodiments of the present invention will be described with reference to the accompanying drawings. The embodiments described below are exemplary aspects of the present invention and the present invention is not limited to the embodiments described below. Note that constituent elements with the same reference signs in the specification and the drawings are assumed to be the same constituent elements.

First Embodiment

Figure 3:
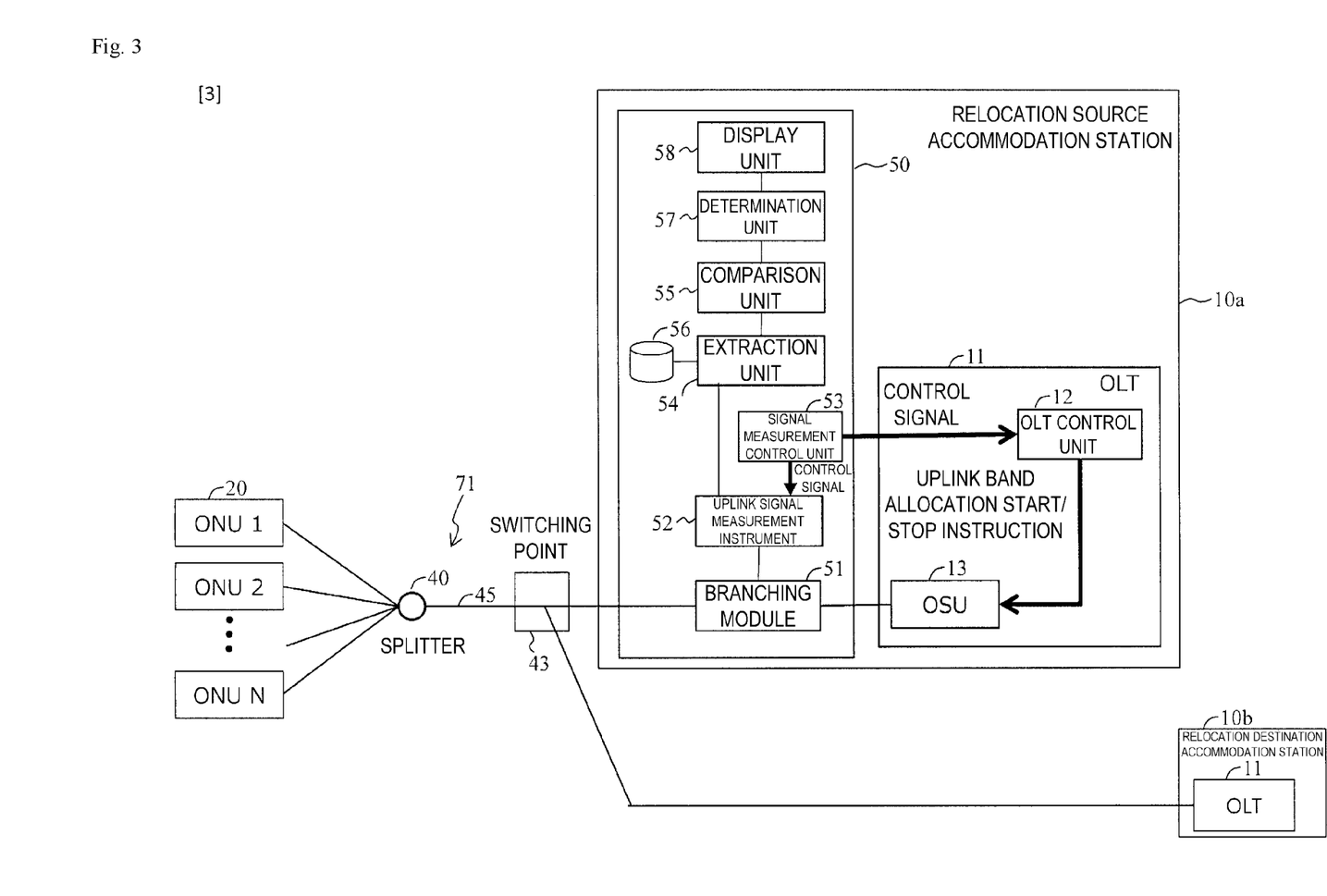
FIG. 3 is a diagram for explaining a diagnostic apparatus according to an embodiment of the present invention.

FIG. 3 is a diagram for explaining a diagnostic apparatus 50 according to an embodiment of the present embodiment.

The diagnostic apparatus 50 is connected to a PON (communication system) 71 that is an optical access network in which an OLT 11 that is a station-side apparatus and one or more ONUs 20 that are user-side apparatuses are connected in a point-to-multipoint form via an optical fiber 45 and a splitter 40. Although the connection location is preferably inside a relocation source accommodation station 10a where the OLT 11 is disposed, the connection location is not limited to this location.

The diagnostic apparatus 50 is a diagnostic apparatus that diagnoses the PON 71 and is connected to the side of the accommodation station 10a of the PON 71. The diagnostic apparatus 50 includes: a signal measurement instrument 52 that measures measurement light transmitted by an ONU 20 connected to an end of the PON 71 and measures a center wavelength and a spectrum width of a spectrum of the measurement light; an extraction unit 54 that acquires an allowable line distance corresponding to the center wavelength and the spectrum width measured by the signal measurement instrument 52 from an allowable line length list 56 that is a relationship between the center wavelength and the allowable line distance that satisfies a selected spectrum width; a comparison unit 55 that compares a transmission distance between an accommodation station 10b newly connected to the PON 71 and the ONU 20 with the allowable line distance acquired by the extraction unit 54; and a determination unit 57 that determines that it is not necessary to update the PON 71 in a case in which the transmission distance is shorter than the allowable line distance and determines that it is necessary to update the PON 71 in a case in which the transmission distance is longer than the allowable line distance.

The diagnostic apparatus 50 further includes: a branching module 51 that branches and takes a part of an uplink signal of the ONU 20 from the optical fiber 45; a signal measurement control unit 53 that provides an instruction for starting and ending measurement to the signal measurement instrument 52; and an OLT control unit 12 that provides an uplink band allocation instruction to an optical subscriber unit (OSU) 13 inside the OLT 11.

Figure 4:
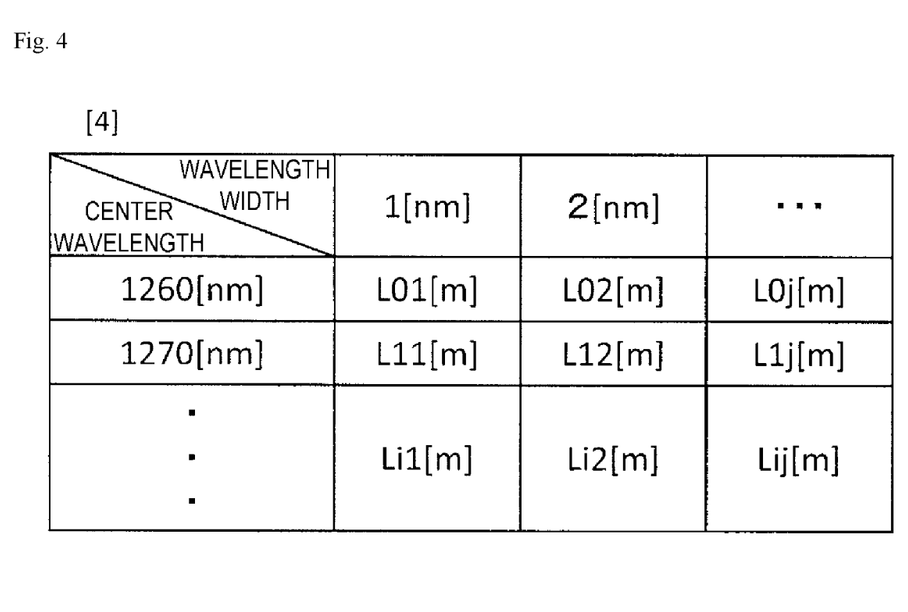
FIG. 4 is a diagram for explaining an allowable line length list included in the diagnostic apparatus according to the embodiment of the present invention.

The allowable line length list 56 is information like that illustrated in FIG. 4. The allowable line length list 56 includes, for example, information that a transmission distance (allowable line distance) for reducing a wavelength width to 1 [nm] or less is L01 [m] in a case in which the center wavelength of light that is propagated through the optical fiber 45 is 1260 [nm] and information that the transmission distance (allowable line distance) for reducing the wavelength width to 2 [nm] or less is L12 [m] in a case in which the center wavelength of light is 1270 [nm].

The allowable line length list 56 is acquired in advance. Known data may be used, or data may be acquired again with the optical fiber 45 or another optical fiber having the same properties as the optical fiber 45 as will be described later.

Optical signals from a plurality of ONUs 20 are multiplexed in the optical fiber 45 of the PON 71. Thus, the signal measurement instrument 52 can acquire only optical signals in which signals from the plurality of ONUs 20 are mixed in the PON 71 that is currently operated. Thus, a method of measuring uplink optical signals for the plurality of ONUs 20 connected to the optical fiber 45 using a time division multiplexing scheme of the PON 71 will be described in the present embodiment.

A case in which an optical signal only from an ONU 20 #1 is measured will be described as an example. The signal measurement control unit 53 provides an uplink band allocation instruction only for the ONU 20 #1 to the OSU 13 via the OLT control unit 12 and provides a measurement start instruction to the uplink signal measurement instrument 52. The OSU 13 that has received the instruction performs the uplink band allocation only on the ONU 20 #1 in a specific period T1 determined in advance and does not perform band allocation on ONUs other than the ONU 20 #1, that is, on the ONU 20 #2 to the ONU 20 #N. On the other hand, the uplink signal measurement instrument 52 measures signals in the specific period T1. The aforementioned processes are repeated for the ONU 20 #1 to the ONU 20 #N, and thus optical signals from the plurality of ONUs 20 can be measured in order in the PON 71 that is being operated.

Next, a description will be provided about a task performed when an accommodation station of an OLT is relocated (operations are switched from an OLT 11 of the relocation source accommodation station 10a that is currently being operated to an OLT 11 of the relocation destination accommodation station 10b) in the PON 71.

A procedure to be performed in this task includes comparing the distance between the OLT and the ONU after the relocation of the OLT with a specification value of an allowable line length with waveform distortion due to wavelength dispersion of the ONU and determining whether to exchange the apparatuses or to add an apparatus.

Preparation Procedure

This procedure is a procedure for acquiring the allowable line length list 56. If information like that in FIG. 4 is known, the information is used as the allowable line length list 56. If information like that in FIG. 4 is not present as known information, the information is acquired as follows. Description will be given using FIG. 7.

Figure 7:
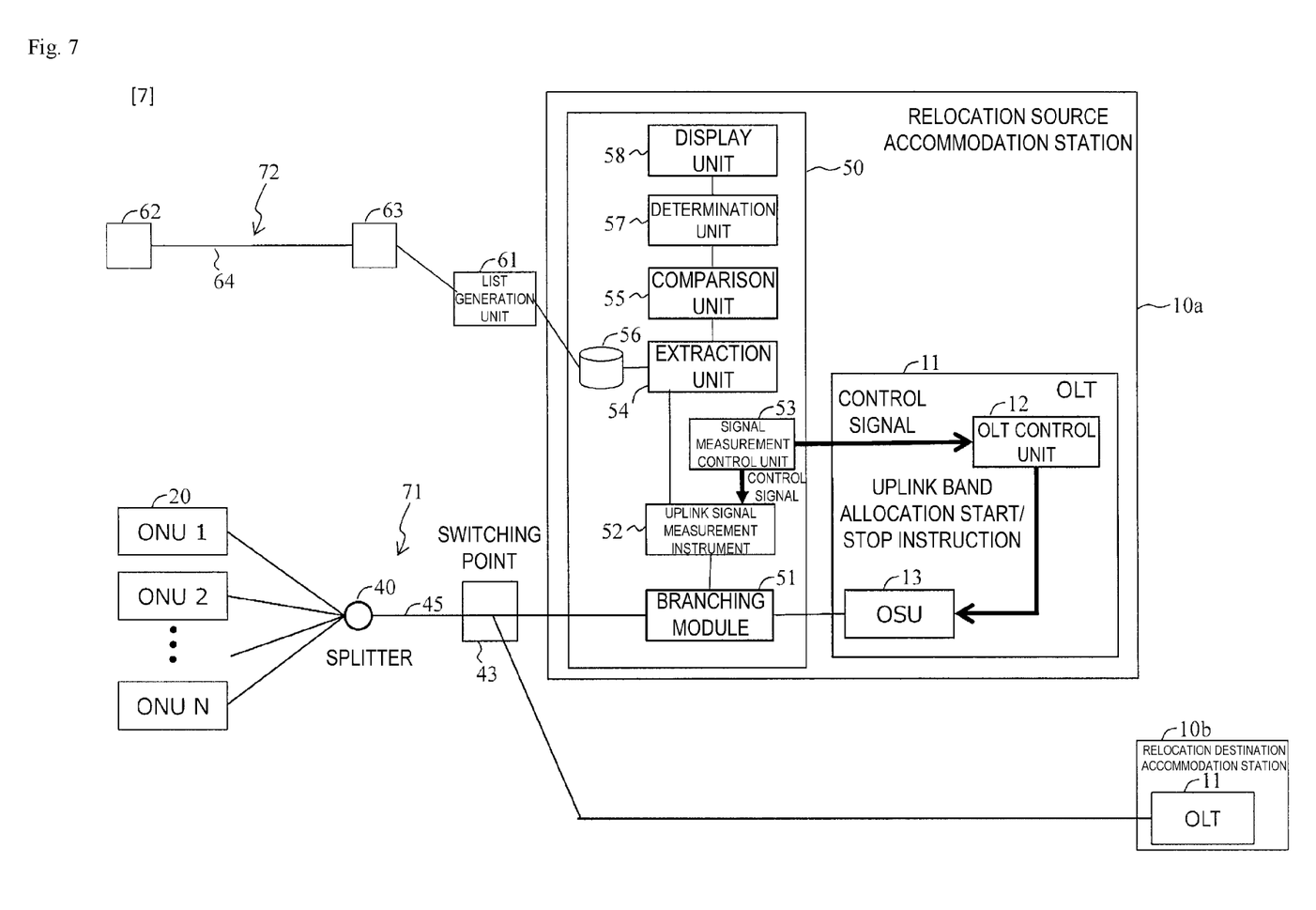
FIG. 7 is a diagram for explaining the diagnostic apparatus according to an embodiment of the present invention.

The diagnostic apparatus 50 further includes a list generation unit 61. The list generation unit 61 generates the allowable line length list 56 by causing test light to be propagated in an experiment system 72 using an optical fiber 64 with the same properties as the optical fiber 45, measuring a spectrum of the test light in the experiment system, and acquiring a relationship between the center wavelength and an allowable line distance that satisfies a selected spectrum width from the spectrum of the test light.

More specific description will be made. A transmitter 62 (which may be an ONU) with a wavelength range (1260 to 1360 nm) defined according to a standard and a measurement instrument 63 capable of measuring a spectrum in the wavelength range are prepared and connected with the optical fiber 64. Here, a plurality of optical fibers 64 with different distances are prepared. Light is transmitted from the transmitter 62 with the center wavelength thereof changed, a spectrum like that in FIG. 1 is measured by the measurement instrument 63, and a wavelength width is acquired. Then, another optical fiber 64 with a different distance is used to transmit light from the transmitter 62 again with the center wavelength thereof changed, the spectrum is measured by the measurement instrument 63, and the wavelength width is acquired. The list generation unit 61 can create the list (FIG. 4) of the relationship of the allowable line length between the OLT and the ONU through the repetition. The list generation unit 61 causes the diagnostic apparatus 50 to save the created list as the allowable line length list 56.

Note that influences of attenuation of light intensity due to other factors are reduced by keeping the optical fiber 64 in a state with no branch points such as a splitter, and it is possible to more accurately acquire the allowable line length of the optical fiber 64 caused by waveform distortion due to wavelength dispersion.

Diagnostic Method

Figure 8:
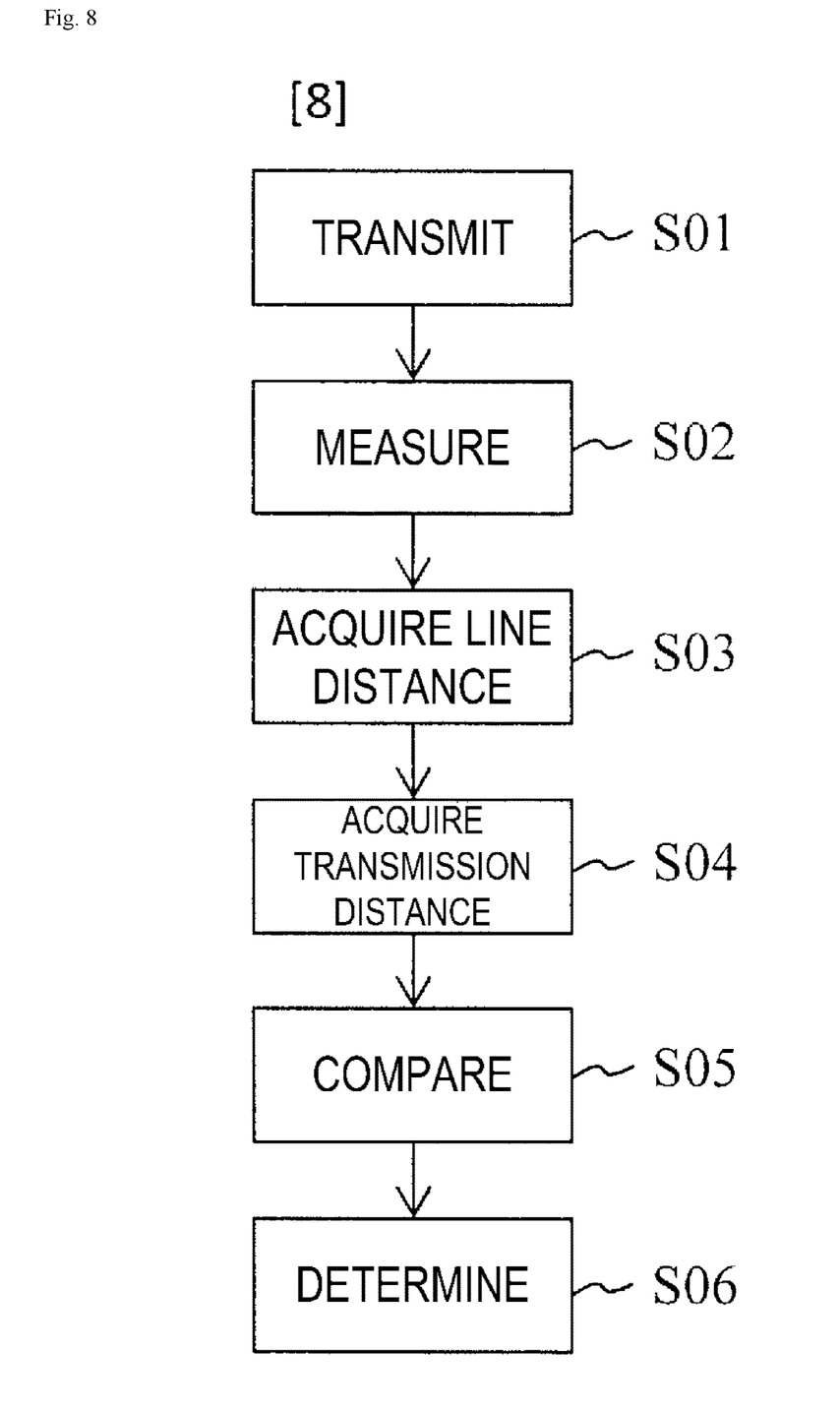
FIG. 8 is a diagram for explaining a diagnostic method according to an embodiment of the present invention.

FIG. 8 is a flowchart for explaining the diagnostic method. The diagnostic method includes: transmitting measurement light from a terminal (ONU 20) connected to an end of a communication system (PON 71) (transmission step S01); measuring a center wavelength and a spectrum width of a spectrum of the measurement light measured by a measurement instrument 52 connected to a side end of an accommodation station (OLT 11) in the communication system (PON 71) (measurement step S02); acquiring an allowable line distance corresponding to the measured center wavelength and the spectrum width from an allowable line length list 56 that is a relationship between the center wavelength and an allowable line distance that satisfies a selected spectrum width (line distance acquisition step S03); acquiring a transmission distance between an accommodation station 10b newly connected to the communication system (PON 71) and the terminal (ONU 20) (transmission distance acquisition step S04); comparing the allowable line distance acquired from the allowable line length list 56 with the transmission distance (comparison step S05); and determining that it is not necessary to update the communication system (PON 71) in a case in which the transmission distance is shorter than the allowable line distance and determining that it is necessary to update the communication system (PON 71) in a case in which the transmission distance is longer than the allowable line distance (determination step S06).

Note that "to update the communication system" means an increase in distance such as replacement with an ONU including a DFB-LD or an APD mounted thereon and installation of a dispersion compensator. A dispersion compensator is an apparatus that compensates for wavelength dispersion using an optical region dispersion compensation technique or an electrical region dispersion compensation technique described above.

The diagnostic method is characterized in that the measuring of the center wavelength and the spectrum width of the spectrum of the measurement light is performed for each terminal and the determining of whether to update the communication system is performed for each terminal.

In other words, in the transmission step in S01 and the measurement step in S02, the signal measurement instrument 52 measures an uplink spectrum for each ONU in the PON 71 that is being operated, and the center wavelength and the wavelength width are acquired from the measured spectrum.

In the line distance acquisition step in S03, the extraction unit 54 acquires, from the allowable line length list 56, an allowable line distance at the center wavelength and the wavelength width obtained in the measurement step in S02.

In the transmission distance acquisition step in S04, the comparison unit 55 acquires a transmission distance between the OLT 11 of the relocation destination accommodation station 10b and each ONU 20. The transmission distance is acquired from a value of design.

In the comparison step in S05, the comparison unit 55 compares the distance between the OLT and the ONU after the relocation of the accommodation station of the OLT obtained in the transmission distance acquisition step in S04 with the allowable line distance obtained in the line distance acquisition step in S03.

In the determination step in S06, the determination unit 57 performs the following determination. The determination involves determining that it is not necessary to take an action to increase the distance when the transmission distance is shorter than the allowable line distance and determining that it is necessary to take an action to increase the distance when the transmission distance is longer than the allowable line distance, based on the comparison in the comparison step in S05.

The result of the determination performed by the determination unit 57 may be displayed on the display unit 58.

Second Embodiment

The method in which the signal measurement instrument 52 measures the uplink optical signal only for the ONU that is a measurement target has been described in the first embodiment. In the present embodiment, a description will be provided about a method in which uplink optical signals are acquired from all ONUs connected to the optical fiber 45 and a specific ONU signal is extracted among the uplink optical signals. In the present embodiment, a description will be provided about operations that are different from those in the first embodiment.

Figure 5:
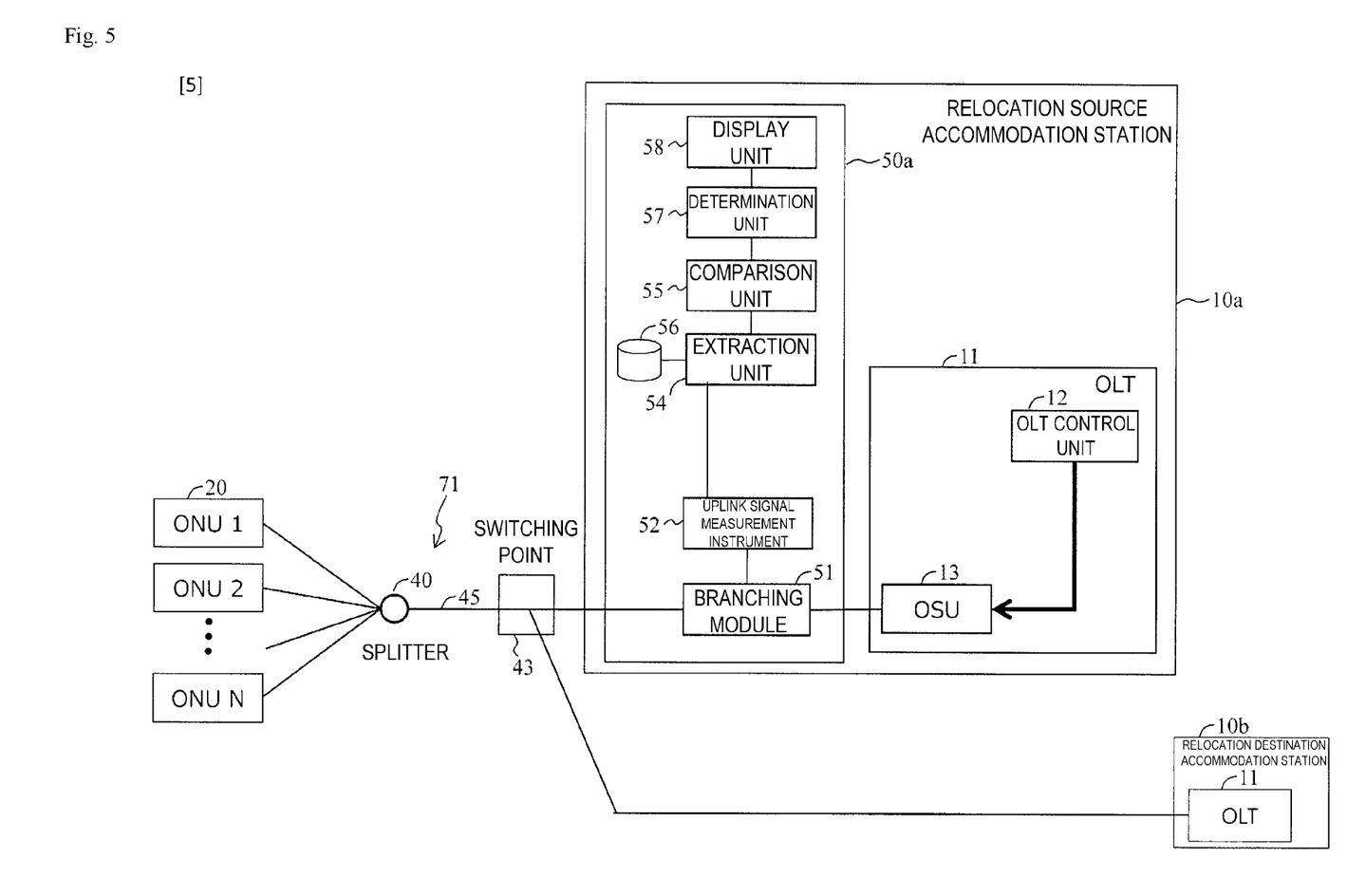
FIG. 5 is a diagram for explaining the diagnostic apparatus according to an embodiment of the present invention.

FIG. 5 is a diagram for explaining a diagnostic apparatus 50a according to an embodiment of the present embodiment. The diagnostic apparatus 50a is different from the diagnostic apparatus 50 according to the first embodiment in that the diagnostic apparatus 50a does not include the signal measurement control unit 53 and the OLT control unit 12 does not provide an uplink band allocation start/stop instruction to the OSU 13. Thus, the signal measurement instrument 52 acquires light in which uplink optical signals from all the ONUs connected to the optical fiber 45 are multiplexed. The spectrum of the light is a spectrum obtained by overlapping a plurality of spectra as illustrated in FIG. 6.

Thus, the signal measurement instrument 52 performs the measuring of the center wavelength and the spectrum width of the spectrum of the measurement light by collectively performing the measurement with the measurement light from the plurality of ONUs 20, performing peak analysis on the measurement result for separation into each spectrum of the corresponding measurement light, and measuring the center wavelength and the spectrum width from each separated spectrum.

Also, when the determination unit 57 determines whether to update the PON 71, the determination unit 57 determines whether to update the communication system after measuring the center wavelength and the spectrum width of the spectrum of the measurement light again for each ONU 20 if there is at least one spectrum having a transmission distance longer than the allowable line distance.

Figure 6:
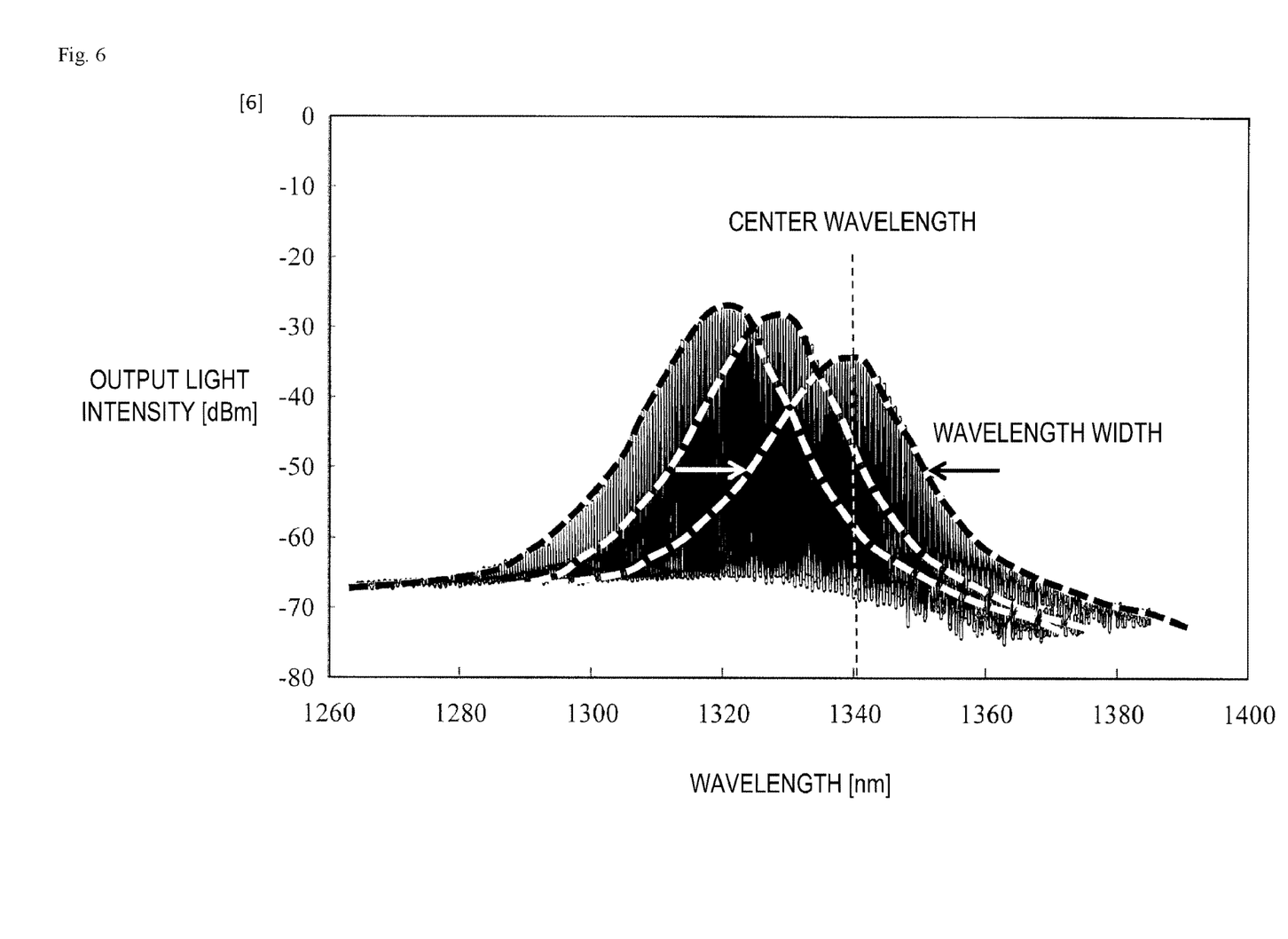
FIG. 6 is a diagram for explaining a spectrum of measurement light measured by the diagnostic apparatus according to the embodiment of the present invention.

As illustrated in FIG. 6, the collectively acquired spectrum include a plurality of peaks. Thus, the signal measurement instrument 52 performs peak analysis on the acquired spectrum for separation into a spectrum of each ONU. Then, the extraction unit 54, the comparison unit 55, and the determination unit 57 perform the diagnostic method described in the first embodiment on each spectrum and determines whether to update the communication system at the time of relocation of the accommodation station of the OLT.

Note that in the diagnostic method according to the present embodiment, the relationship between each separated spectrum and the ONU 20 is not known. Thus, in a case in which the determination unit 57 determines that it is necessary to update the communication system for any spectrum, the time division multiplexing scheme is used to determine whether to update the communication system for each ONU as described in the first embodiment.

Other Embodiments

As described above, there are two factors that inhibit an increase in distance of the PON system, namely attenuation of light intensity and waveform distortion due to wavelength dispersion. The diagnostic apparatus and the diagnostic method according to the embodiments of the present invention are adapted to diagnose whether influences of waveform distortion due to wavelength dispersion of the ONU do not cause any problem after relocation of the accommodation station of the OLT. Thus, the wavelength distortion due to wavelength dispersion of the OLT and the attenuation of light intensity that accompanies relocation of the OLT are not diagnosed by the diagnostic apparatus and the diagnostic method according to the embodiments of the present invention and are diagnosed by another method, and the communication system is used without being updated if the diagnosis result is within a range in which no problem will occur, or the apparatus is revised as needed.

In regard to the wavelength width that expresses a feature of the spectrum, a half width is typically used, but output light intensity may be defined by a wavelength width in a range obtained by subtracting predetermined intensity (A [dB]) from light intensity of the center wavelength.

Although the allowable line length list in FIG. 4 is configured with the allowable line distance for the center wavelength and the wavelength width of the spectrum, the allowable line length list may be configured with the allowable line distance only for the center wavelength.

In the creation of the allowable line length list in FIG. 4 in the aforementioned preparation procedure, not all the transmitters 62 (ONUs) in the wavelength range (1260 to 1360 nm) defined by the standard may be able to be prepared. In this case, the allowable line distance between the OLT and the ONU of the ONU with a selected center wavelength and a selected wavelength width may be estimated from the result of the allowable line distance between the OLT and the ONU of the transmitter 62 (ONU) that can be prepared by a regression analysis scheme.

Also, because the ONU 20 is placed in a user's home, the temperature of an installation environment may significantly vary. Thus, the oscillation spectrum of the ONU 20 may shift to the long-wavelength side with a temperature rise, and waveform distortion due to wavelength dispersion may increase due to a temperature property of the LD. Thus, in order to have a margin for a temperature change in the ONU installation environment, the extraction unit 54 may output, as the allowable line distance, a value obtained by subtracting a value on the assumption of a temperature change from the allowable line distance obtained from the allowable line length list 56 in the line distance acquisition step in S03.

Effects

The present invention can reduce replacement of apparatuses and addition of an apparatus, which are unnecessary, at the time of relocation of an accommodation station of an OLT in the PON system.

REFERENCE SIGNS LIST

10a Relocation source accommodation station
10b Relocation destination accommodation station
11 OLT
12 OLT control unit
13 OSU
20 ONU
40 Splitter
43 Switching point
45 Optical fiber
50, 50a Diagnostic apparatus 51 Branching module
52 Signal measurement instrument
53 Signal measurement control unit
54 Extraction unit
55 Comparison unit
56 Allowable line length list
57 Determination unit
58 Display unit
61 List generation unit
62 Transmitter
63 Measurement instrument
64 Optical fiber
71 Communication system (PON)
72 Experiment system

The invention claimed is:

1. A diagnostic apparatus for an optical communication system comprising:
- a signal measurement circuit configured to be connected to a side end of a first accommodation station in a communication system, measure measurement light transmitted by a terminal connected to an end of the communication system, and measure a center wavelength and a spectrum width of a spectrum of the measurement light;
- an extraction circuit configured to acquire an allowable line distance corresponding to the center wavelength and the spectrum width measured by the signal measurement instrument from an allowable line length list that is a relationship between the center wavelength and the allowable line distance that satisfies a selected spectrum width;
- a comparison circuit configured to compare a transmission distance between a second accommodation station newly connected to the communication system and the terminal with the allowable line distance acquired by the extraction circuit; and
- a determination circuit configured to determine that it is not necessary to update the communication system in a case in which the transmission distance is shorter than the allowable line distance and determine that it is necessary to update the communication system in a case in which the transmission distance is longer than the allowable line distance.

2. The diagnostic apparatus according to claim 1,
wherein the optical communication system is a passive optical network (PON), the terminal is an optical network unit (ONU), and the accommodation station is an optical line terminal (OLT),
the signal measurement instrument measures the center wavelength and the spectrum width of the spectrum of the measurement light for each terminal, and
the determination unit determines whether to update the communication system for each terminal.

3. The diagnostic apparatus according to claim 1, wherein
the optical communication system is a passive optical network (PON), the terminal is an optical network unit (ONU), and the accommodation station is an optical line terminal (OLT),
the signal measurement circuit performs the measuring of the center wavelength and the spectrum width of the spectrum of the measurement light by
collectively performing the measurement with the measurement light from a plurality of terminals,
performing peak analysis on a measurement result for separation into each spectrum of the corresponding measurement light, and
measuring the center wavelength and the spectrum width from each separated spectrum, and
when the determination circuit determines whether to update the communication system, the determination unit determines whether to update the communication system after the center wavelength and the spectrum width of the spectrum of the measurement light are measured again for each terminal if there is at least one spectrum having a transmission distance longer than the allowable line distance.

4. The diagnostic apparatus according to claim 1, further comprising:
a list generation circuit that generates the allowable line length list by
causing test light to be propagated in an experiment system using the same optical fiber as an optical fiber in the communication system and measuring a spectrum of the test light in the experiment system, and
acquiring a relationship between the center wavelength and an allowable line distance that satisfies a selected spectrum width from the spectrum of the test light.

5. A diagnostic method for an optical communication system comprising:
- transmitting measurement light from a terminal connected to an end of a communication system;
- measuring a center wavelength and a spectrum width of a spectrum of the measurement light measured by a measurement instrument connected to a side end of a first accommodation station in the communication system;
- acquiring an allowable line distance corresponding to the measured center wavelength and the spectrum width from an allowable line length list that is a relationship between the center wavelength and the allowable line distance that satisfies a selected spectrum width;
- acquiring a transmission distance between a second accommodation station newly connected to the communication system and the terminal;
- comparing the allowable line distance acquired from the allowable line length list with the transmission distance; and
- determining that it is not necessary to update the communication system in a case in which the transmission distance is shorter than the allowable line distance and determining that it is necessary to update the communication system in a case in which the transmission distance is longer than the allowable line distance.

6. The diagnostic method according to claim 5,
wherein the optical communication system is a passive optical network (PON), the terminal is an optical network unit (ONU), and the accommodation station is an optical line terminal (OLT),
the measuring of the center wavelength and the spectrum width of the spectrum of the measurement line is performed for each terminal, and
the determining of whether to update the communication system is performed for each terminal.

7. The diagnostic method according to claim 5, wherein
the optical communication system is a passive optical network (PON), the terminal is an optical network unit (ONU), and the accommodation station is an optical line terminal (OLT),
the measuring of the center wavelength and the spectrum width of the spectrum of the measurement light includes collectively performing the measurement with the measurement light from a plurality of the terminals, performing peak analysis on a measurement result for separation into each spectrum of the corresponding measurement light, and measuring the center wavelength and the spectrum width from each separated spectrum, and the determining of whether to update the communication system includes determining whether to update the communication system after the center wavelength and the spectrum width of the spectrum of the measurement light are measured again for each terminal when there is at least one spectrum having a transmission distance longer than the allowable line distance.

8. The diagnostic method according to claim 5, wherein the allowable line length list is generated by causing test light to be propagated in an experiment system using the same optical fiber as an optical fiber in the communication system and measuring a spectrum of the test light in the experiment system, and acquiring a relationship between the center wavelength and an allowable line distance that satisfies a selected spectrum width from the spectrum of the test light.

\* \* \* \* \*